United States Patent [19]

Zorzy

[11] 4,001,515
[45] Jan. 4, 1977

[54] INTERFACING UNIT FOR TELEPHONE NETWORKS
[75] Inventor: Plato Zorzy, Marblehead, Mass.
[73] Assignee: Astreon Corporation, Lowell, Mass.
[22] Filed: Nov. 21, 1974
[21] Appl. No.: 525,755
[52] U.S. Cl. .............................. 179/18 HB; 179/43; 179/84 R
[51] Int. Cl.² ........................................ H04M 1/00
[58] Field of Search .......... 179/84 R, 84 A, 84 VF, 179/18 H, 18 HB, 16 E, 16 EC, 17 E, 2.5 R, 2 R, 2 A, 43; 328/167, 138, 140; 307/233 R

[56] References Cited
UNITED STATES PATENTS

| | | | |
|---|---|---|---|
| 2,395,916 | 3/1946 | Stanley | 179/43 |
| 2,874,226 | 2/1959 | Pharis | 179/43 |
| 3,264,412 | 8/1966 | Van Eynde | 179/17 E |
| 3,428,755 | 2/1969 | Draper | 179/16 E |
| 3,501,591 | 3/1970 | Krasin | 179/84 R |
| 3,591,728 | 7/1971 | Birck | 179/84 R |

*Primary Examiner*—Kathleen H. Claffy
*Assistant Examiner*—Joseph A. Popek
*Attorney, Agent, or Firm*—Pearson & Pearson

[57] ABSTRACT

A telephone interfacing circuit. A digital bandpass filter transmits a continuous pulse stream in response to a ringing signal which has a frequency in the normal range of voice signals. A high frequency reference pulse source clocks a first counter to determine a final interval. Then a second counter establishes a second interval corresponding to the bandwidth. During this interval, a gate can pass incoming signals in the pass band. Another circuit discriminates a continuous pulse stream to actuate a ringing signal oscillator for transmitting a ringing signal at another frequency.

10 Claims, 4 Drawing Figures

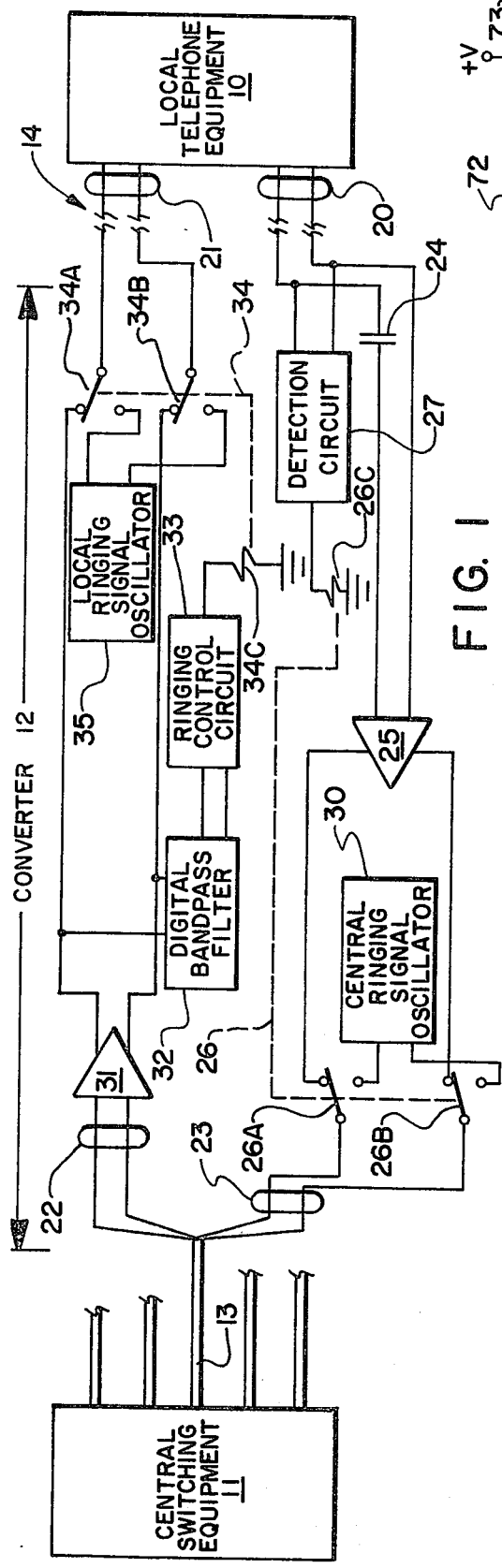
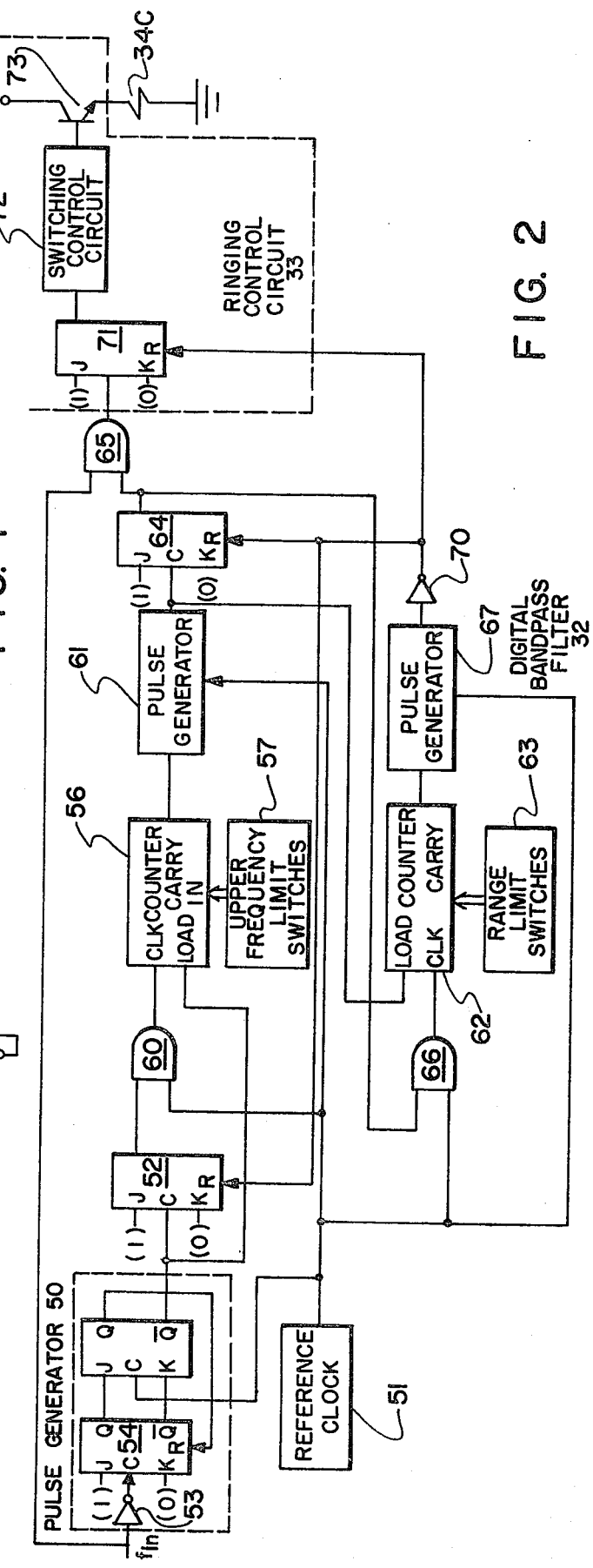
FIG. 1
FIG. 2

INTERFACING UNIT FOR TELEPHONE NETWORKS

BACKGROUND OF THE INVENTION

This invention relates to telephone networks and more specifically, to converters for interconnecting portions of such telephone networks.

A telephone network comprises several portions, including central switching equipment and local equipment. The central switching equipment transmits intelligence or voice signals at a variety of frequencies and a ringing signal at a relatively high frequency, for example, 2600 Hertz. Oftentimes, however, the local equipment responds to a ringing signal at a much lower frequency, for example, 20 Hertz. In order for such local equipment and central switching equipment with disparate ringing signal frequencies to operate together, some means must be provided for converting the ringing signal at one frequency to a ringing signal at the other frequency.

Such conversion means must also discriminate between the high frequency ringing signals from the central switching equipment and voice signals which may be in the same range of frequencies. Conventionally, active filters or LC filters are in series between the output from the central switching circuit and define a narrow passband centered on the high frequency ringing signal. However, the selectivity of such bandpass filters depends upon the quality factor (Q) of the filter. LC filters are normally limited to relatively low values of quality factor. If active filters are used, it is necessary to increase amplifier gain to improve selectivity, but increased amplifier gain leads to stability problems.

Further, it is difficult to alter both the bandwidth and the center frequency of these filters. This is a disadvantage in trying to construct a converter, because a given network may use any one of several high frequency ringing signal frequencies.

Therefore, it is object of this invention to provide a telephone conversion circuit with improved ringing signal detection means.

Another object of this invention is to provide an improved ringing signal detection circuit including a digital bandpass filter.

Still another object of this invention is to provide a variable bandwidth, highly selective bandpass filter for operation at a number of frequencies.

SUMMARY OF THE INVENTION

In accordance with this invention, an incoming ringing signal from a central switching equipment passes to a digital bandpass filter. The filter defines two successive time intervals initiated upon receipt of each ringing signal cycle. The second interval is a time window which corresponds to an acceptable range of frequencies. If the next cycle of an incoming signal coincides with the second interval, the digital filter passes this cycle to a switching circuit and enables a ringing frequency oscillator to transmit a low frequency ringing signal. Otherwise, the digital filter blocks the incoming signal.

This invention is pointed out with particularity in the appended claims. A more thorough understanding of the above and further objects of this invention may be attained by referring to the following description taken in conjunction with the accompanying drawings.

BRIEF DESCRIPTION OF THE DRAWINGS

FIG. 1 is a block diagram of a converter which embodies this invention;

FIG. 2 is a detailed logic diagram of a digital bandpass filter and ringing control circuit shown in FIG. 1;

DESCRIPTION OF A PREFERRED EMBODIMENT

Figure 3:
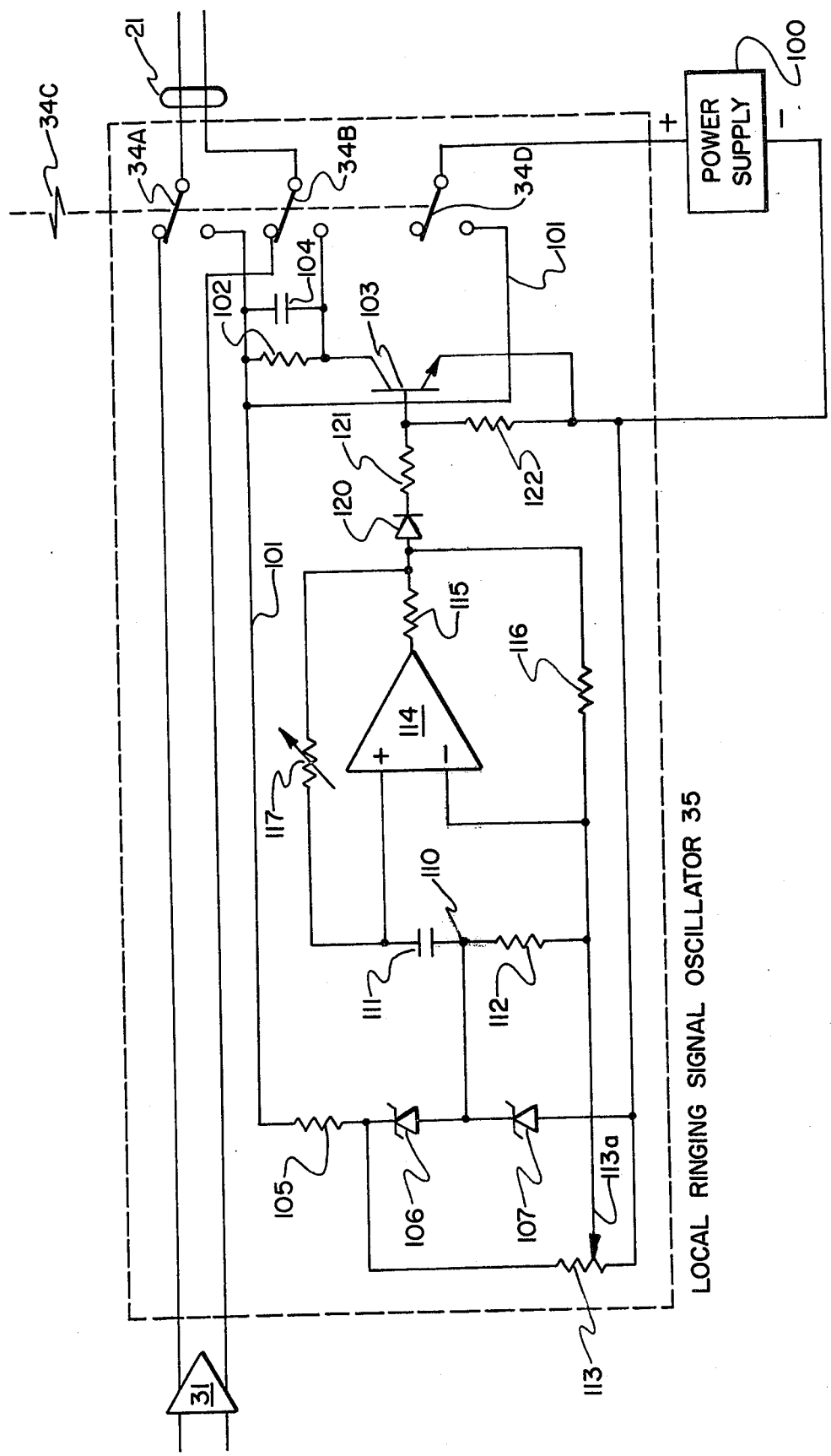
FIG. 3 depicts, in schematic form, a specific embodiment of the local ringing oscillator shown in FIG. 1.

FIG. 1 depicts a four-wire/four-wire telephone network including local telephone equipment 10 and central switching equipment 11. A converter or interface, 12 constructed in accordance with this invention connects to one cable 13 of several cables from the central switching equipment to a cable 14 from the local telephone equipment 10. As shown in FIG. 1, the converter 12 is located with the central switching equipment 11, although its location is arbitrary. Other telephone network arrangements such as two-wire/two-wire and four-wire/two-wire networks are also adapted to use this invention. The specific network shown in FIG. 1 is chosen merely for explaining the invention.

Still referring to FIG. 1, the local telephone equipment 10 transmits various signals including a low frequency or local ringing signal over a pair of conductors 20 and receives various signals including a local ringing signal over a pair of conductors 21. The central equipment transmits and receives signals including the high frequency or central ringing signals at a frequency which differs from local ringing signal over pairs of conductors 22 and 23, respectively. For purposes of explanation, it can be assumed that the local and central ringing signals have frequencies of 20 Hertz and 2600 Hertz, respectively.

The local telephone equipment 10 transmits over a pair of conductors 20 voice signals which represent the voice of someone speaking into the local telephone equipment 10. It also transmits the local ringing signal. Normally the voice signals are at a frequency which is much greater than the ringing signal, so a capacitor 24 in series with the input to an amplifier 25 can block the local ringing signal while passing the voice signals. Thus, as the local telephone equipment 10 transmits voice signals, they pass from the conductor pair 20 to the amplifier 25 and and contacts 26A and 26B of a relay 26 and then onto the conductor pair 23 for receipt by the central switching equipment 11.

On the other hand, when the local telephone equipment 10 transmits a ringing signal, the capacitor 24 blocks it. However, a detection circuit 27 responds to the local ringing signal and energizes a coil 26C which is part of the relay 26. This switches the contacts 26A and 26B to receive the output of a central ringing signal oscillator 30. The central ringing signal oscillator 30 transmits the local ringing signal, which is 2600 Hertz in this specific example.

When the central switching equipment transmits voice signals onto the cable 13, they are received by an amplifier 31 having inputs connected to the conductor pair 22. The frequency spectrum of the voice signals does include the central ringing signal frequency. Voice signals in a narrow pass band defined by a digital bandpass filter 32 do pass through the filter 32. However, a ringing control circuit 33 remains inactive so that during normal voice communications a relay 34 stays unenergized and contacts 34A and 34B stay in the position shown in FIG. 1. Thus, the relay 34 couples the output signals from the amplifier 31 to the conductor pair 21, for receipt by the local telephone equipment 10. When the central switching equipment 11 transmits a ringing signal, the digital bandpass filter 32 and ringing control circuit 33 operate to energize a coil 34C in the relay 34. The contacts 34A and 34B then shift from the position shown and connect the output of a local ringing signal oscillator 35 to the conductor pair 21. In this example, the local ringing signal oscillator 35 has a frequency of 20 Hertz.

Thus, the converter 12 contains amplifiers 25 and 31 for coupling and amplifying voice signals between the local telephone equipment 10 and the central switching equipment 11. Furthermore, the converter 12 contains circuits for detecting ringing signals at one frequency, such as the digital bandpass filter 32 and ringing control circuit 33 on one hand and the detection circuit 27 on the other means for transmitting ringing signals at the other frequency, such as the central ringing signal oscillator 30 and the local ringing signal oscillator 35. Furthermore, while the frequencies of voice and ringing signals can be the same, a highly selective digital bandpass filter 32 and a ringing control circuit 33 discriminate the voice and ringing signals.

An example of a digital bandpass filter 32 is shown in FIG. 2. The incoming voice and ringing signals from the amplifier 32 are designated $f_{in}$. The digital bandpass filter 32 receives the $f_{in}$ signals at a pulse generator 50 which also receives clock pulses from a reference clock oscillator 51, normally a crystal controlled oscillator. The leading edge, or positive-going transition, of each $f_{in}$ pulse causes the pulse generator 50 to produce, at an output thereof, a negative-going pulse which serves as a clocking input to a JK flip-flop 52.

The pulse generator 50 comprises an inverter 53 which couples the incoming $f_{in}$ signal to the clocking input of a JK flip-flop 54. The JK flip-flop 54 is conditioned to be set in response to a clocking pulse, and the inverter 53 provides the necessary clocking transistion upon the positive-going transition of the $f_{in}$ signal. Thus, the leading edge of the input signal sets the flip-flop 54 and immediately conditions a flip-flop 55 to be set in a response to a clocking transition. The reference clock oscillator 51 provides the clocking input for the flip-flop 55, and the next negative-going transition of the reference clock pulse sets the flip-flop 55. When the flip-flop 55 sets, it immediately resets the flip-flop 54, so the next negative-going transition resets the flip-flop 55. Thus, the pulse generator 50 responds to each positive-going transition of an input signal by producing a negative pulse at the output which has the interval of one cycle of the reference clock frequency.

The leading edge of the negative-going pulse from the pulse generator 50 performs two functions. First, it begins loading into a counter 56 data from upper frequency limit switches 57. Secondly, it sets the flip-flop 52 to enable an AND signal 60 to begin passing to the reference clock pulses to a counter 56.

In a preferred embodiment, the reference clock oscillator 51 transmits clock pulses at a frequency which is 1000 times the frequency of the input signal $f_{in}$. That is, if the central ringing signal frequency is 2600 Hertz, the reference clock oscillator 51 produces a clocking pulse at a frequency of 2.6 megahertz. With this ratio, the counter 56 is a modulo 1000 counter. The upper frequency limit switches 57 can enter a binary-coded-decimal (BCD) number representing a time interval corresponding to the maximum frequency which the digital bandpass filter 32 is to pass.

For example, assume that the upper frequency limit switches 57 are set to BCD value 10 and that the counter 56 is a BCD counter. The leading edge of the $f_{in}$ signal causes the flip-flop 52, AND gate 60, and counter 56 to operate in synchronism with the reference clock 51 and to begin timing a first interval. Initially the counter 56 receives a value of 10 and thus, transmits a CARRY signal after the AND gate passes 990 counts. This represents a time interval of $t=(990/1000) (1/2600)$ seconds and an upper frequency limit of $1/\Delta t$ or 2626.3 Hertz.

When this first interval terminates, the counter 56 transmits a CARRY signal to a pulse generator 61, constructed like the pulse generator 50. Thus, the pulse generator 61 produces a negative-going pulse which loads a second counter 62 with a number from range limit switches 63 at the end of the first timing interval. In this case, the number is the complement of the number representing the total range of acceptable frequencies is transferred into the counter 62. Assuming that the digital bandpass filter is to pass frequencies between 2600 Hertz plus 1% and minus 2%, which are within 98% and 101% of that frequency, the upper limit switches 57 are set to 10 (representing 1%) and assuming that the counter 62 is a modulo 1000 counter, the range limit switches 63 are set to the counter 62 to 30 representing a 3% range. The counter 62, if a BCD counter receives the BCD value 970.

The leading edge of the negative-going pulse from the pulse generator 61 also sets a flip-flop 64, conditioned to be set in response to a clocking transition, to enable AND gates 65 and 66. The other input to the AND gate 65 is the incoming signal $f_{in}$. Thus, the flip-flop 64, when set, defines a "window" during which the digital bandpass filter 32 can pass a next $f_{in}$ signal through the AND gate 65 to the ringing control circuit 33. This window continues to stay open for a time interval defined by the range limit switches 63.

Specifically, as soon as the AND gate 66 is enabled, successive clocking pulses from the reference clock 51 advance the counter 62 and after a time interval corresponding to the range, (i.e., a time interval corresponding to 30 reference clock pulses as a specific example) the counter 62 transmits a CARRY signal. In this specific example, the range switches 63 determine a time interval of $t=(30/1000) (1/2600)$ seconds for a lower frequency limit of $1/\Delta t$ or 2545.3 Hertz. The CARRY signal triggers a pulse generator 67, constructed like a pulse generator 50. An inverter 70 couples the negative-going pulse from the pulse generator 67 and resets the flip-flop 64 immediately. This disables the AND gate 65 and closes the "window". This pulse from the inverter signal also resets the flip-flop 52 and disables the AND gate 60.

In the incoming signal is within the bandwidth determined by the upper frequency switches 57 and range limit switches 63, the first incoming signal $f_{in-1}$ begins the timing operation. As the next incoming signal $f_{in-2}$ appears after the first time interval, defined by the counter 56, but before the second time interval terminates, which the counter 62 defines, the $f_{in-2}$ pulse passes through the AND gate 65. It also recycles the digital bandpass filter 32 so it can begin timing the first interval to see if the next incoming signal $f_{in-3}$ also is at the same frequency.

If the incoming signal $f_{in}$ has a frequency which is less than the acceptable range of frequencies, the second cycle of incoming signals, $f_{in-2}$, reaches the digital bandpass filter 32 after the pulse generator 67 resets the flip-flop 64. Therefore, it cannot pass through the AND gate 65. If the incoming frequency is above the acceptable range, than the second pulse in succession, $f_{in-2}$, arrives before flip-flop 64 sets, so the AND gate 65 is disabled. In either situation, the second pulse triggers the pulse generator 50 and initiates a new timing sequence.

The digital bandpass filter 32 is very selective. Its selectivity depends upon the frequency of the reference clock oscillator 51. With a frequency ration of 1000:1, the upper and lower frequency limits are established to 0.1%. Further, the digital bandpass filter 32 can be constructed to distinguish different incoming frequencies. This is especially useful in telephone applications where different central switching element equipment 11 shown in FIG. 1, may produce central ringing signals of different frequencies. For example, ringing signals of 570, 1000, 1600, and 2600 Hertz are common. A single converter 12 as shown in FIG. 1, can operate in response to those signals by constructing the reference clock oscillator 51 to produce output signals at 0.570, 1.000, 1.600 and 2.600 megahertz, respectively. Then a single-pole four-position switching circuit can select the appropriate reference clock frequency. Assuming that the counters 56 and 62 are both modulo 1000 counters and that the switches 57 and 63 and the counters 56 and 62 use BCD numbers, an upper frequency limit switch setting of 10 (i.e., 1.0%) and a range switch setting of 30 (i.e., 3.0%) produces a filter circuit with pass bands for the different incoming frequencies as follows:

BANDWIDTH

| CENTER FREQUENCY | LOWER LIMIT | UPPER LIMIT |
|---|---|---|
| 570 | 558.7 | 575.8 |
| 1000 | 980.1 | 1010.1 |
| 1600 | 1568.2 | 1616.2 |
| 2600 | 2545.3 | 2626.3 |

When an incoming signal is with the pass band of the filter 32, there is no attenuation. Further, the above-mentioned upper and lower frequency limits are, with a reference clock frequency which is 1000 times the incoming frequency, accurate to within 0.1%. This means that the upper frequency limit of 2626.3 hertz, has a minimum value of approximately 2623 hertz and a maximum value of 2628 Hertz. Graphically, this represents a filter response with substantially vertical skirts. That is, if the digital bandpass filter 32 is set to pass a maximum frequency of 2626.3 Hz, it will block a signal with a frequency above 2628 hertz and pass, without attenuation, a signal at a frequency of 2623 hertz. This means that the skirt has a bandwidth of 5 hertz.

The digital bandpass filter 32 can be set to pass as narrow band of frequencies. By itself, however, it cannot discriminate voice signals in the pass band and the central ringing frequency. However, the output from the filter 32 will be continuous when the filter 32 receives a ringing signal and random in response to voice signals.

The ringing control circuit 33 distinguishes a continuous and random output. As shown in FIG. 2, each pulse at the bandpass frequency, sets a flip-flop 71 and the pulse generator 67 and inverter 70 reset it. Thus, the output of the flip-flop 71 appears a continuous pulse stream in response to a ringing signal. When voice signals appear on the conductor pair 22 in FIG. 1, the flip-flop 71 transmits pulses in a random fashion.

A switching control circuit 72 receives these pulses. It activates an output in response to the continuous output pulse train. Thus, the circuit 72 acts as a high pass filter. Such circuits are numerous and well known. When the circuit 72 does sense a continuous pulse stream, it turns on a NPN switching resistor 73 and energizes the relay coil 34C. Thus, as shown in FIG. 1, isolates the conductor pair 21 from the amplifier 31 and connects it to the output of the local ringing signal oscillator 35.

FIG. 3 depicts one embodiment of a local ringing oscillator 35 which transmits the local ringing signal when the ringing control circuit 33 in FIGS. 1 and 2 energizes the relay coil 34C. As shown in FIG. 3, the relay coil 34C actuates an additional set of contacts 34D to couple the positive output from a power supply 100 onto a power supply conductor 101. At the same time, the contacts 34A and 34B couple the conductor pair 21 across a resistor 102 in the collector circuit of an NPN transistor 103. A capacitor 104 minimizes the effect of transient signals. A regulator circuit including a resistor 105 and two zener diodes 106 and 107 provides a constant voltage input to a junction 110 between a capacitor 111 and resistor 112. The voltage regulator also energizes a potentiometer 113 and the position of a wiper arm 113a controls the potential input to the inverting input of an operational amplifier 114. The capacitor 11 and resistor 112 couple the junction 110 to the non-inverting and inverting inputs of the amplifier 14 respectively.

An output resistor 115 couples the output signal from the amplifier 114 to a negative feedback resistor 116 and a positive feedback potentiometer 117. This circuit oscillates at a frequency the positive feedback potentiometer 117 controls. The potentiometer 113 controls the symmetry of the output signal. Normally, the oscillator output signal has a 50% duty cycle and a frequency of 20Hz.

A diode 120 and resistor 1212 and 122 couple positive half cycles to the negative input terminal of the power supply 100 and control the conductor of the transistor 103 to thereby produce the local ringing signal.

Figure 4:
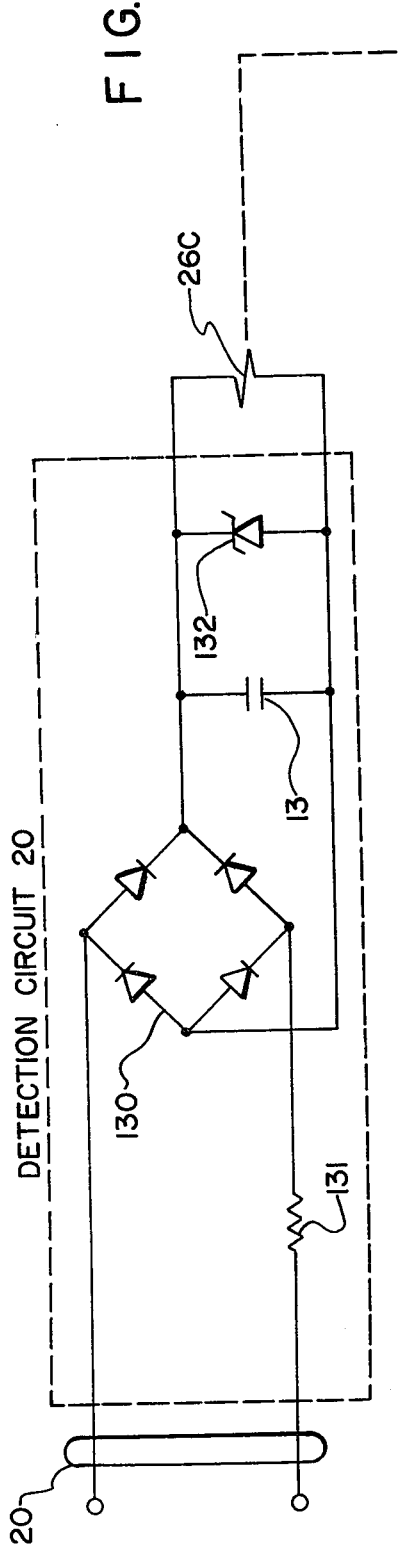
FIG. 4 is a schematic of one embodiment of a ringing signal detection circuit and central ringing oscillator circuit.
Figure 4:
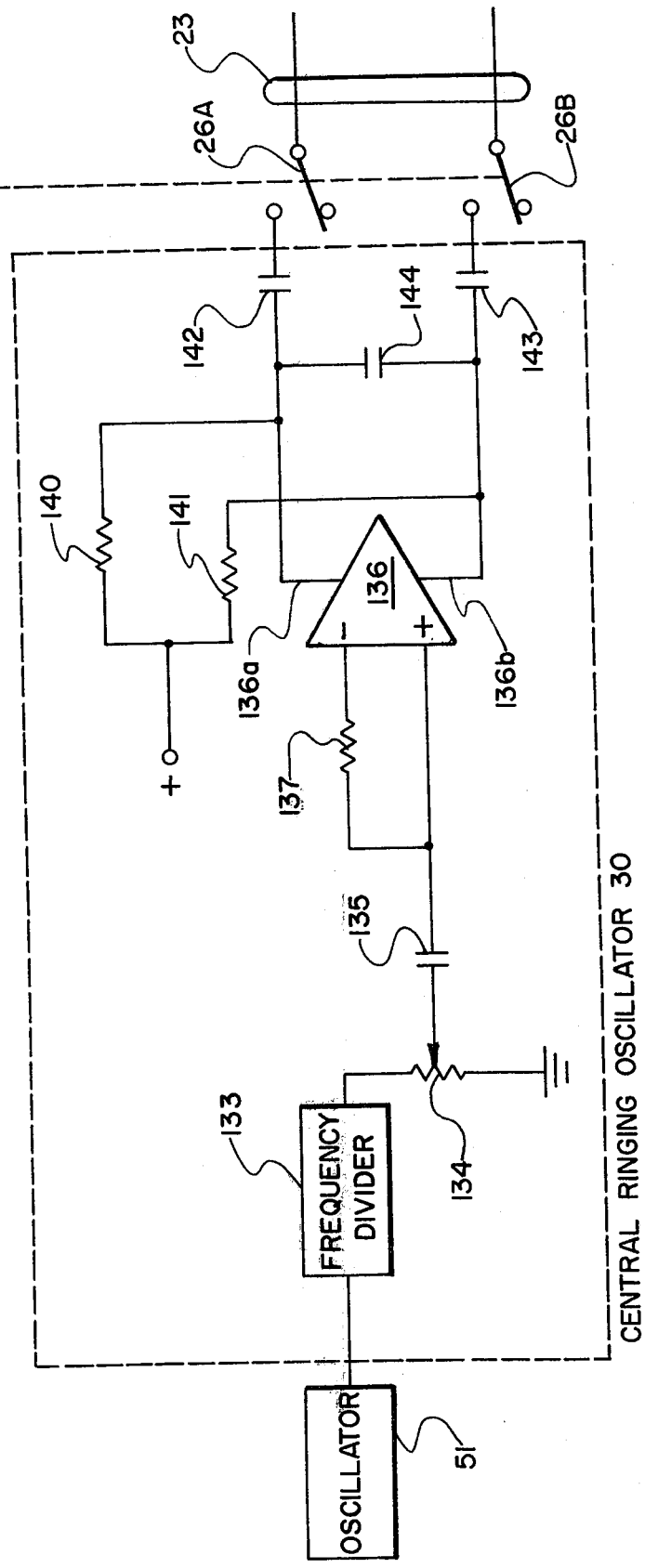

FIG. 4 shows the details of the detection circuit 27 and central ringing signal oscillator 30. All incoming signals on the conductor pair 20 energize a full wave rectifier 130 coupled to the pair 20 by a current limiting resistor 131. A capacitor 131 acts as a high frequency by-pass so only the ringing signal at 20Hz frequency can produce an output signal and energize the relay coil 26C. A diode 132 in parallel with the capacitor 131 limits the voltage across the coil 26C and also tends to minimize negative transient signals.

When the detection circuit 20 energizes the relay coil 26C, contacts 26A and 26B couple the conductor pair 23 to the central ringing frequency oscillator 30. Although a separate oscillator might be used, it is often convenient to use the reference clock oscillator 51 (also shown in FIG. 2). A frequency divider 133 provides the proper division to produce the central ringing signal frequency and the signal appears across a potentiometer 134. The potentiometer 134 acts as a volume control and the ringing signal passes through an input coupling capacitor 135 to a fixed gain amplifier 136 with an input resistor 137. Resistors 140 and 141 connect to a positive power supply (3.g., the power supply 100 in FIG. 3) and to the respective positive and negative amplifier output terminals 136a and 136b. The resulting output 2600 Hz signal is then coupled through the capacitors 142 and 143 to the relay contacts 26A and 26B. A noise suppression and transient protection capacitor 144 connects across the output terminals from the amplifier.

In summary, FIGS. 1 through 4 illustrate a converter and individual circuits to connect between local telephone equipment and central switching equipment which are characterized by having disparate ringing signal frequencies. Furthermore, it includes a digital bandpass filter and ringing control circuit which discriminates an incoming ringing frequency which is in the spectrum of voice signals. It will be apparent that the description is limited to one specific embodiment of this invention. Other circuitry can be substituted. Therefore, it is the object of the appended claims to cover all variations and modifications as come within the true spirit and scope of this invention.

What is claimed as new and desired to be secured by Letters Patent of the United States is:

1. An interface unit for coupling voice and ringing signals between local telephone equipment and central switching equipment wherein the frequency of the ringing signals transmitted and received by the central switching equipment differs from the frequency of the ringing signals transmitted and received by the local telephone equipment, said interface comprising:
    A. a first channel for coupling the voice and ringing signals from the central switching equipment to the local equipment, said first channel including:
        i. switching means having a normal state and an active state,
        ii. amplifier means for receiving voice and ringing signals from the central switching equipment, said switching means, in a normal state, coupling the output signals from said amplifier means to the local telephone equipment.
        iii. a local ringing signal oscillator circuit for transmitting a ringing signal at the same frequency as the local telephone ringing signal frequency, said switching means, in an active state, coupling output signals from said local ringing signal oscillator circuit to the local telephone equipment, and
        iv. means including a digital bandpass filter for
        v. discriminating ringing signals from the central switching equipment thereby to shift said switching means to the active state, said discriminating means being connected to the output of said amplifier means, and
    B. a second channel for coupling the voice and ringing signals to the central switching equipment from the local equipment including
        i. switching means having a normal state and an active state,
        ii. amplifier means for receiving voice signals from the local switching equipment, said switching means, in a normal state, coupling output signals from said amplifier means to the central switching equipment,
        iii. a central ringing signal oscillator circuit for transmitting a ringing signal at a frequency corresponding to the central switching equipment ringing signal frequency, said switching means, in an active state, coupling output signals from said central ringing signal oscillator circuit to the central switching equipment, and
        iv. detecting means for shifting said switching means to an active state in response to the receipt of a ringing signal from the local telephone equipment.

2. An interface unit for coupling voice and ringing signals between local telephone equipment and central switching equipment wherein the frequency of the ringing signals that are transmitted and received by the central switching is in the spectrum of voice signal frequencies and differs from the frequency of the ringing signals transmitted and received by the local telephone equipment, said interface comprising a first channel for coupling the voice and ringing signals from the central switching equipment to the local equipment, said first channel including:
    A. switching means having a normal state and an active state,
    B. amplifier means for amplifying the voice and ringing signals from the central switching equipment, said switching means, in a normal state, coupling the amplified voice and ringing signals to the local telephone equipment,
    C. a local ringing signal oscillator circuit for transmitting a ringing signal at the local telephone ringing signal frequency, said switching means, in an active state, coupling output signals from said local ringing signal oscillator circuit to the local telephone equipment, and
    D. a bandpass filter including:
        i. means for transmitting reference pulses at a known frequency,
        ii. means for synchronizing the amplified voice and ringing signals to the reference pulses,
        iii. first counting means connecting to said synchronizing means for counting to a first limit representing an upper frequency limit at a rate determined by the reference pulses,
        iv. second counting responsive to the first counting means reaching its limit for counting a number representing a lower frequency limit at a rate determined by the reference pulses, and
        v. means enabled when said first counter reaches its limit for passing the amplified voice and ringing signals in the passband defined by said filter, and
    E. means responsive to continuous pulses from said bandpass filter for shifting said switching means to the active state.

3. An interface unit as recited in claim 2 additionally comprising a second channel for coupling the voice and ringing signals to the central switching equipment from the local equipment including
    A. switching means having a normal state and an active state,
    B. amplifier means for receiving voice signals from the local switching equipment, said switching means, in a normal state, coupling output signals from said amplifier means to the central switching equipment,
    C. a central ringing signal oscillator circuit for transmitting a ringing signal at a frequency corresponding to the central switching equipment ringing signal frequency, said switching means, in an active state, coupling output signals from said central ringing signal oscillator circuit to the central switching equipment, and D. detecting means for shifting said switching means to an active state in response to the receipt of a ringing signal from the local telephone equipment.

4. An interface circuit as recited in claim 3 wherein the ringing signal transmitted and received by the central switching equipment has a frequency $f$ and said reference frequency transmitter includes a crystal controlled oscillator circuit, said oscillator frequency being $nf$ wherein $f$ is the frequency of the central switching equipment ringing signal frequency and $n$ is greater than 1.

5. An interface unit as recited in claim 4 wherein said $n = 1000$.

6. An interface unit as recited in claim 4 adapted for connection to different central switching equipment characterized by different central ringing signal frequencies, said reference frequency transmitter including a plurality of crystal controlled oscillator circuits, each of said crystal controlled oscillator circuits corresponding to one of the central switching equipment ringing signal frequencies.

7. An interface unit as recited in claim 4 wherein said first counting means includes a digital counter and means responsive to said synchronizing means for loading a predetermined number representing the upper frequency limit into said counter.

8. An interface unit as recited in claim 7 wherein said counter in said first counting means includes a clocking input and said first counting means additionally comprises a. a bistable circuit set by said synchronizing means and reset when said second counting means reaches its limit, and b. gating means enabled by said bistable circuit when it sets for coupling the reference pulses to said counter.

9. An interface unit as recited in claim 7 wherein said second counting means includes a digital counter and means responsive to said first counting means for loading a predetermined number representing filter bandwidth into said counter.

10. An interface unit as recited in claim 9 wherein said counter in said second counting means includes a clocking input and said second counting means additionally comprises:

a. a bistable circuit set when said first counting means reaches the first limit and reset when said second counting means reaches its limit, and b. gating means enabled by said bistable circuit when it sets for coupling reference pulses to said counter.

* * * * *